April 20, 1954  J. B. BIDWELL  2,675,701
LOAD MEASURING APPARATUS
Filed Feb. 7, 1951  3 Sheets-Sheet 1
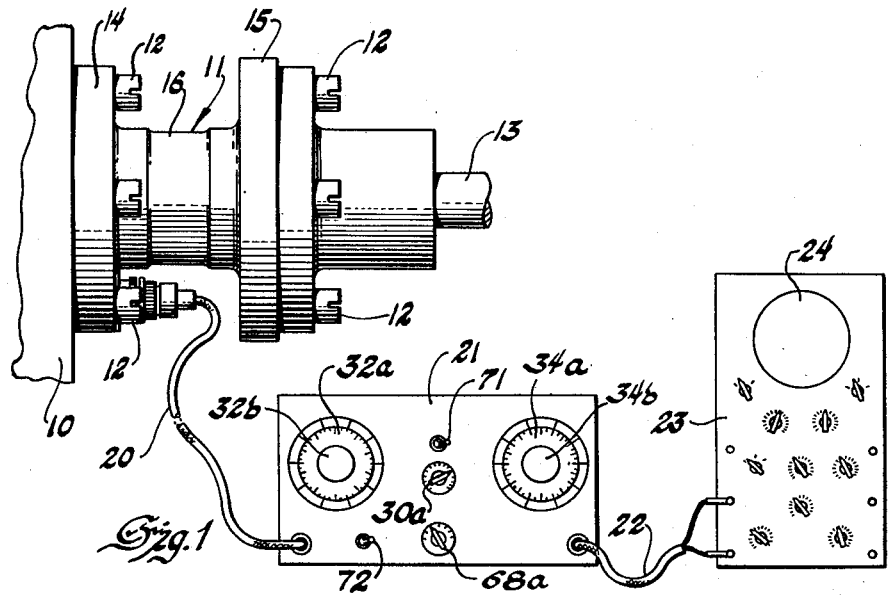
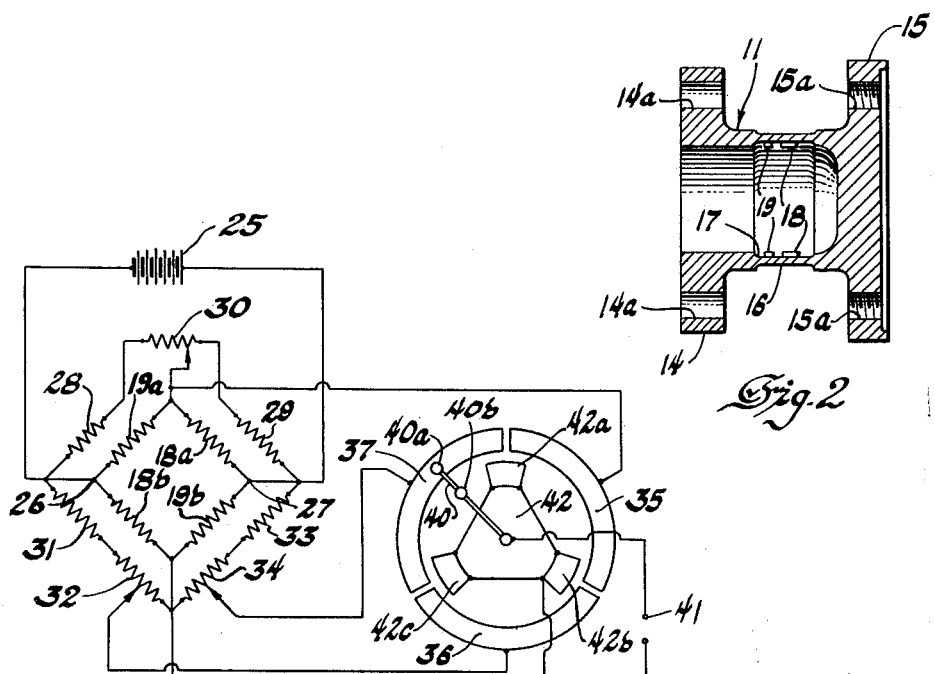
Inventor
Joseph B. Bidwell
By Willits, Helmig & Baillio
Attorneys Inventor
Joseph B. Bidwell
By Willito, Helwig & Baillio
Attorneys Patented Apr. 20, 1954

2,675,701

UNITED STATES PATENT OFFICE 2,675,701

LOAD MEASURING APPARATUS

Joseph B. Bidwell, Royal Oak, Mich., assignor to General Motors Corporation, Detroit, Mich., a corporation of Delaware Application February 7, 1951, Serial No. 209,878

7 Claims. (Cl. 73—141)

This invention relates to load measuring apparatus, and more particularly to apparatus for measuring tension and compression loads.

One feature of the invention is that it provides improved load measuring apparatus; another feature of the invention is that it provides improved apparatus particularly adapted to measure static or dynamic tension and/or compression loads of a fatigue machine; a further feature of the invention is that it provides a pre-calibrated deformable testing head having strain sensitive impedance means thereon connected into a bridge circuit; still another feature is that the invention provides variable calibrating means connected to said bridge to provide reference potential indications and switching means adapted to alternately connect said strain sensitive means and said calibrating means to an indicating means, as an oscilloscope; yet a further feature is that said calibrating means comprise first variable calibrating resistance means connected to the bridge for providing a potential indicative of one testing characteristic, as tension load, and second variable calibrating resistance means connected to said bridge for providing a potential indicative of another testing characteristic, as compression load; yet another feature is that said switching means comprise primary switching means adapted to sequentially connect the strain sensitive means and the first and second calibrating means to the oscilloscope, and secondary switching means adapted to connect the oscilloscope intermittently to an intermediate potential, as ground, to reference indication indicative of no load; and still a further feature of the invention is that it provides means for varying the speed of operation of the switching means, whereby said speed of operation may be displaced in frequency from the frequency at which an alternating tension and compression load is applied to the piece under test.

Figure 4:
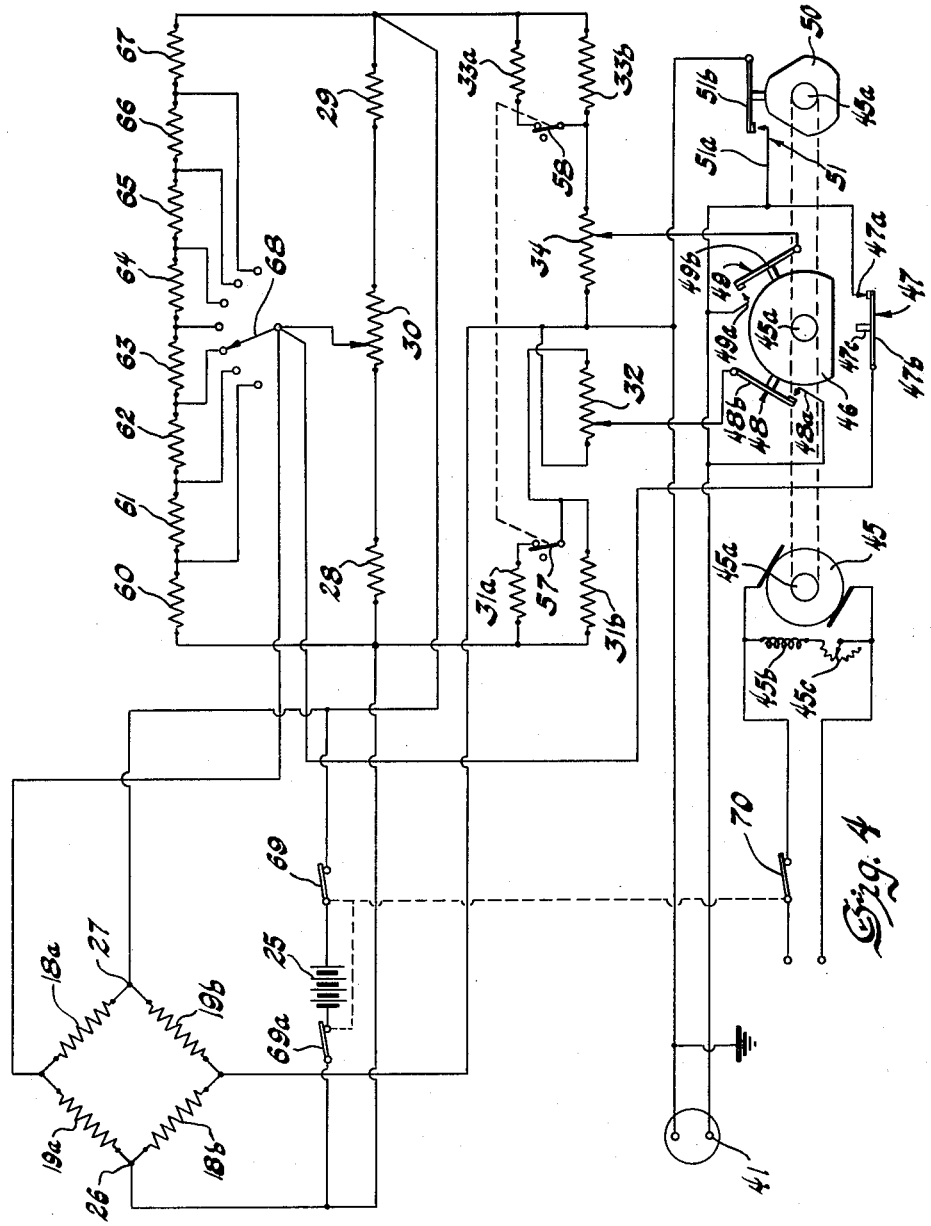
Figure 5:
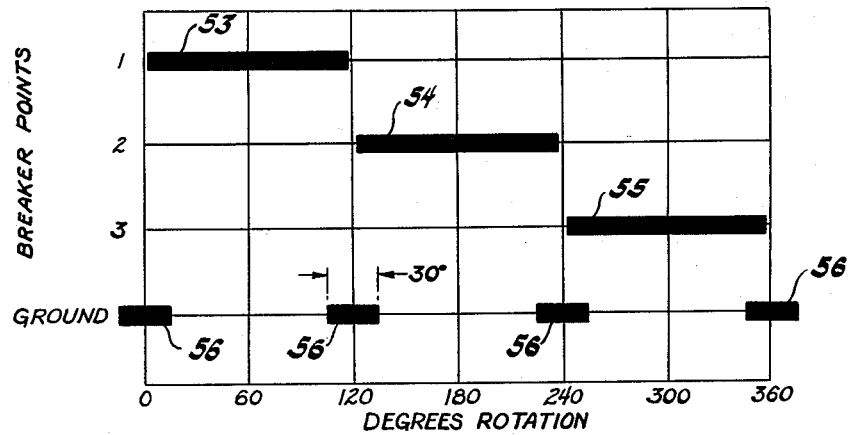
Figure 6:
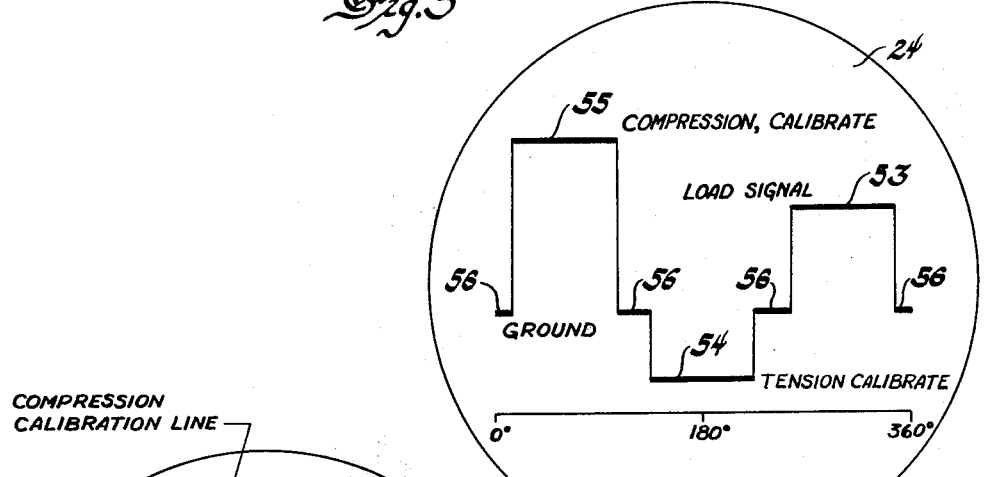
Figure 7:
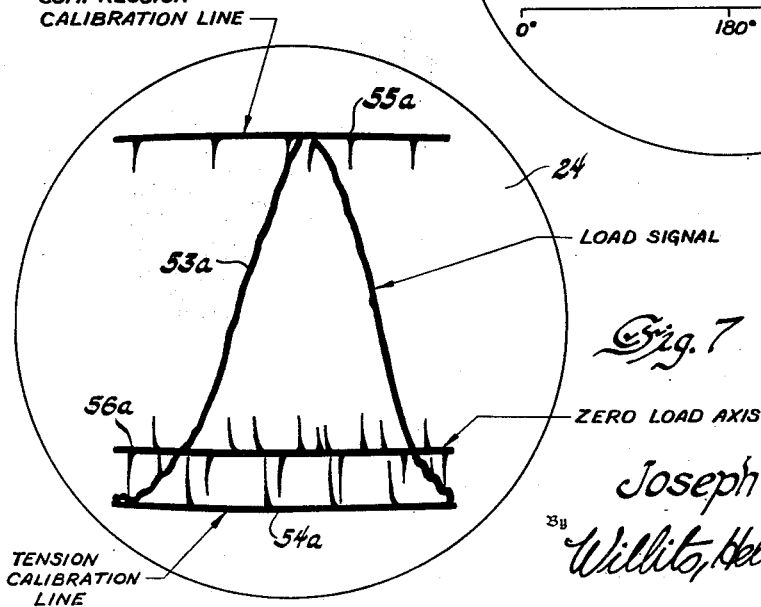

Other features and advantages of the invention will be apparent from the following description and from the drawings, in which:

Figure 1 is a fragmentary side-elevational view of a fatigue machine having the improved load measuring apparatus associated therewith; Figure 2 is a vertical longitudinal section through the deformable testing head shown in elevation in Figure 1; Figure 3 is a schematic diagram of the bridge and switching circuits; Figure 4 is a wiring diagram of the electrical circuits and the switching means; Figure 5 is a timing diagram illustrating the operation of the switching means; Figure 6 is a front elevational view of an oscilloscope screen showing the indications provided for a static compression load; and Figure 7 is a front elevational view of an oscilloscope screen showing the indications provided for a dynamic compression and tension load as might be applied by a fatigue machine.

Accurate measurement of the tension and compression load applied to a test piece in a fatigue machine has been one of the principal problems associated with such machines. A variety of means have been used to measure the load in the past, but with limited success.

I have invented and am herewith disclosing and claiming improved load measuring apparatus particularly designed for measuring tension and compression loads of a fatigue machine. With the improved apparatus both static and dynamic loads may be measured. Briefly, the apparatus utilizes strain sensitive impedance means mounted on a pre-calibrated deformable testing head which is mounted on the fatigue machine in series with the piece under test. The strain sensitive impedance means are connected into an electrical bridge to provide a load diagram on the face of an oscilloscope, the circuit being designed to utilize the oscilloscope as a voltage comparator. In the improved apparatus accuracy of measurement is not affected by non-linearity or variation of gain of the oscilloscope or by changes in the voltage which supplies the electrical bridge. While the improved apparatus is particularly designed for load measurement, it is equally suitable for making other quantitative measurements.

In the past, loads applied to test pieces in fatigue machines have been measured by Bourbon tube pressure gauges and a check valve connected to a loading cylinder in order to measure peak cylinder pressure. Measurements made in this manner are unsatisfactory when pressure surges occur in the cylinder and are not transmitted to the test piece due to inertia and damping. Another disadvantage of the method is that it is unsuitable for double acting machines where alternate compression and tension loads are applied and the total load must be determined by the difference in pressure on opposite sides of the loading pistons.

An extensometer system has also been used, employing the test piece and test fixtures as a spring, and the load being determined by measuring the compression or extension of these elements. Two compound screw micrometers are mounted on the test machine and cooperating contacts are mounted on a rod rigidly fixed to the loading piston. At the extreme positions of the loading piston the contacts close and cause a neon light to glow. The micrometers are adjusted by admitting high pressure oil into the loading cylinder to produce the desired maximum load and then setting the contacts so that they would just close. Under test, a dynamic load is applied which will just cause the neon light to blow at the end of the stroke. The principal disadvantages in this system are caused by drift due to thermal expansion of the test piece and the machine and the effect of dynamic oil films in the set-up of the test piece, resulting in overloading the test piece. Another disadvantage is that the load could only be checked by stopping the test and calibrating the micrometers with the high pressure oil supply.

In order to avoid the disadvantages of these earlier systems, means have been provided for utilizing a bridge pick-up device to measure the deflection or deformation of a weighing head. In addition to measuring peak loads, this means also provides an indication of the load in diagrammatic form. The method has had disadvantages in that the inductive bridge pick-ups have non-linear response and there is no satisfactory method of calibrating the devices. In addition, false readings are caused by bending of the member upon which the inductive pick-ups are mounted.

Wire strain gauges have been utilized as pick-ups by cementing one or more strain gauge to the specimen under test. The gauges may then be used in a simple potentiometer circuit in connection with an oscilloscope. Obviously it is inconvenient to cement a gauge on each test piece and then to calibrate the gauge for load sensitivity. Furthermore, this method does not provide a means for measuring static load and does not provide a zero load reference indication. In addition, non-linearity of gain of the oscilloscope limits the accuracy of the apparatus.

The load measuring apparatus described and claimed herein eliminates all of the disadvantages found in the prior art as above set forth.

Referring now more particularly to the drawings, Figure 1 shows the apparatus in use in a fatigue machine 10. A deformable testing head designated generally at 11 is mounted on the machine by means of bolts 12 in series with a test piece 13. In order to overcome mechanical failure due to fatigue of the testing head, the head is machined from a solid piece of heat-treated steel. The deformable head may have a longitudinal outer dimension of about 5⅞ inches and may have a diameter at its widest point of about 8 inches. The end of the cylindrical testing head which is adjacent the fatigue machine 10 has a peripheral flange 14 having a plurality of equally spaced openings 14a therethrough for the reception of the bolts 12. At the other end of the testing head is a peripheral flange 15 having holes 15a for the reception of the bolts 12. Intermediate flanges 14 and 15 is a cylindrical body portion 16, and a chamber 17 in the interior of the body portion opens through the center portion of the flange 14. The inner and outer wall surfaces of the body portion 16 are polished free of tool marks for a distance (measured axially) of about 2½ inches.

A plurality of wire strain gauges are mounted on the interior wall of the intermediate body portion 16 of the deformable head 11. While other pick-up elements might be used to measure deformation in the testing head, wire strain gauges are preferred because of their inherent linearity, ease of temperature compensation, and ease of application. The strain gauges may be obtained commercially and may, for example, be Baldwin SR-4 Bakelite Gauges.

In the preferred construction a total of eight gauges is used, four being axially positioned and four being circumferentially positioned, these latter four gauges providing temperature compensation. The four axially positioned gauges, indicated by the reference character 18, are equally spaced around the circumference of the inner wall of the body portion 16 within the chamber 17, and alternate ones of the gauges 18 are connected together so that effectively there are two separate strain sensitive impedance or resistance means. Similarly, the circumferentially positioned gauges, indicated by the reference character 19, are equally spaced from each other and alternate ones are connected together to provide two separate temperature compensating resistors.

The gauges are connected into a bridge circuit as shown in Figure 3, these connections being made by means of a cable 20 which connects the strain gauges with other circuit elements in a housing 21. A cable 22 extends from the housing to an oscilloscope 23 which constitutes means for providing an indication. In Figure 3 the axially arranged measuring gauges are designated at 18a and 18b and the circumferentially arranged temperature compensating gauges are designated at 19a and 19b.

The strain gauges may be cemented to the inner wall of the deformable head with Bakelite cement or the like, and preferably the inner wall of the deformable head is flash tin plated to prevent rusting under the gauges.

The pick-up head 11 is calibrated statically both for tension and compression in a testing machine which applies a known load. This is accomplished by first balancing the bridge with no load and then sequentially applying known load increments and sequentially adjusting the calibrating means hereinafter described to provide a corresponding voltage as indicated by coincidence of the calibrate line with the load line on the oscilloscope screen, the pattern being somewhat similar to that shown in Figure 6. A plot or graph is then made of the potentiometer readings versus the known load increments. Individual pre-calibration of the pick-up head eliminates variables of gauge factor and the area of stressed section. These calibration curves may then be used to interpret the value of dynamic load signals.

In Figure 3 voltage supply means connected to the bridge comprises a battery 25 connected across bridge input terminals 26 and 27. If desired a D. C. power supply having a well regulated output capacity of about 70 milliamperes could be used in place of the battery. It should be noted that neither terminal of the battery 25 is at ground potential.

Means for balancing the bridge comprises a resistance network connected across the bridge input terminals 26 and 27. In Figure 3 this network is shown as comprising resistors 28 and 29 and a potentiometer 30 connected therebetween and in series therewith. In the actual circuit, as shown in Figure 4, additional resistors may be provided for coarse and fine balance control. A variable calibrating device connected to the bridge comprises a resistance network connected across the bridge input terminals and including a resistor 31 and a potentiometer 32 connected across the resistance 18b and a resistor 33 and a potentiometer 34 connected across the resistance 19b. The junction between the resistances 18b and 19b is connected to ground, and the junction between the resistances 19a and 18a is connected to a switching device.

The switching device shown in Figure 3 includes primary switching means comprising three segmental contacts 35, 36 and 37 in consecutive arrangement around the periphery of a circle. The contact 35 is connected to the mid-point between the resistances 19a and 18a as above described; the contact 36 is connected to the movable tap on the potentiometer 32; and the contact 37 is connected to the movable tap on the potentiometer 34.

A rotatable contacting member 40 is mounted on a shaft for rotation so that a contact 40a on the member 40 sequentially engages the segmental contacts 35, 36 and 37. The rotatable contact 40 is connected to an output terminal 41 for connection to the oscilloscope 23.

Secondary switching means comprise grounded contact 42 having three equally spaced lobes 42a, 42b and 42c respectively positioned intermediate the space between adjacent segmental contacts 35, 36 and 37 and overlapping said respective primary switching contacts. A contact 40b on the member 40 engages the lobes 42a, 42b and 42c sequentially upon rotation of the member 40. Each of the lobes 42a–c may occupy a 30 degree angle of arc.

Figure 4 shows an operative wiring diagram of the apparatus wherein a motor 45 is provided to operate the switching means. As illustrated, the motor may have a shunt field 45b connected in series with a variable resistance 45c for varying the speed of the motor. In the event that it is not desired to utilize a variable switching speed, a small conventional A. C. motor may be used instead of the D. C. motor illustrated, and in any event an A. C. motor may be used in conjunction with a variable speed transmission device to vary the switching speed.

In Figure 4 the mechanical form of switching means comprises a conventional automobile type breaker assembly in which the primary switching means comprises a cam 46 mounted on the shaft 45a of the motor 45 for rotation thereby. The cam 46 operates three equally spaced breaker point assemblies designated generally at 47, 48 and 49. The assembly 47 comprises a stationary contact 47a connected to the output terminal 41 and a movable breaker arm 47b having thereon a follower 47c for operation by the cam 46. The arm 47b is connected to the variable tap of the potentiometer 30 and also to the midpoint between the resistance members 18a and 19a in the same manner as the segmental contact 35 schematically shown in Figure 3. The assembly 48 comprises a stationary contact 48a which is connected to the terminal 41 and a movable breaker arm 48b which is connected to the potentiometer 32 in the same manner as the segmental contact 36 of Figure 3. Similarly, the assembly 49 comprises a stationary contact 49a and a breaker arm 49b connected to the potentiometer 34 in the same manner as the segmental contact 37 of Figure 3 is connected.

The secondary switching means comprises a rotatable cam 50 mounted on the shaft 45a and rotatable therewith and a single breaker assembly designated generally at 51 and comprising a stationary contact 51a connected to the output terminal 41 and a movable breaker arm 51b connected to ground.

The cams 46 and 50 are so positioned and arranged that the contacts 51a and 51b will be closed sequentially and briefly just prior to the time that the cam 46 closes any one of the respective breaker assemblies 47, 48 and 49, the closure period of the assembly 51 being for about 30 degrees of a cycle of rotation of the shaft 45a and bridging the gap between successive closures of the respective contacts of the primary switching means. Figure 5 shows a breaker timing diagram which illustrates the operation of the breaker or switching assembly. 53 represents the time during which breaker assembly 47 is closed, this being almost 120 degrees of a cycle of rotation of the cam 46. 54 represents the time during which breaker assembly 48 is closed; and 55 represents the time during which breaker assembly 49 is closed. 56 represents the time during which cam 50 closes the contacts of breaker assembly 51, to connect the terminal 41 to ground. This closure time overlaps the switching between contacts of the primary switch means, and each time the secondary switch means 51 is closed it remains closed for an interval of 30 degrees of a cycle of rotation of the cam 50.

Referring again to Figure 4, the fixed resistance portion 31 of the calibrating device includes resistor sections 31a and 31b adapted to be connected in parallel by means of a switch 57 when said switch is in the position illustrated. When the switch is in the position other than that illustrated, the resistor portion 31a is out of the circuit. The two resistor portions 31a and 31b together with the switch 57 provide a high and low calibration range. Similarly, the fixed portion 33 of the calibration device comprises resistor portions 33a and 33b, the portion 33b being at all times connected to the potentiometer 34 and the portion 33a being adapted to be connected in parallel with the portion 33b by a switch 58 which is ganged for simultaneous operation with the switch 57.

In the wiring diagram of Figure 4 means are provided in connection with the bridge balancing means for providing a coarse balancing range. This means comprises a plurality of tapped resistors 60—67 connected in parallel with the balancing circuit including resistors 28 and 29 and potentiometer 30. The resistance arrangement 60—67 comprises a voltage divider having a plurality of different potential terminals (the respective resistor taps) connected to the terminals of a switch 68. The movable arm of this switch is connected to the mid-point between the bridge resistances 18a and 19a and to the movable tap of the potentiometer 30.

Figure 4 also shows on-off switches 69, 69a and 70, these switches being ganged for simultaneous operation.

Referring again to Figure 1 with reference to the operating mechanisms shown in Figure 4, the position of the movable tap on the tension calibrate potentiometer 32 is controlled by a rotatable dial 32a having an operating handle 32b; and the position of the movable tap of the compression calibrate potentiometer 34 is controlled by a rotatable dial 34a having a handle 34b. The switches 57 and 58 are controlled by a switch operating member 71. The movable arm of the coarse balance adjustment control switch 68 is controlled by a knob 68a; the position of the movable tap on the balance potentiometer fine adjustment is controlled by a knob 30a; and the on-off switches 69, 69a and 70 are controlled by a switch operating member 72.

In the operation of the device, the alternating compression and tension loads applied to the piece under test and to the deformable head 11 by the fatigue machine 10 act to change the resistance of the axially positioned strain gauges 18a and 18b. Connecting two of these strain gauges in opposite arms of the bridge gives a push-pull effect and increases the sensitivity of the device. These changes in the resistance of the strain gauges will change the potential which is applied to the terminal 41 when the primary switching means is connected to the bridge through the breaker assembly 47. Adjustment of the position of the movable tap on the tension calibrate potentiometer 32 will change the potential which is applied to the output terminal 41 when the primary switching means breaker assembly 48 connects the movable tap of the potentiometer 32 with the output terminal 41; and, similarly, the position of the movable tap of the compression calibrate potentiometer 34 will determine the potential which is applied to the output terminal 41 when the primary switching means breaker assembly 49 connects this last mentioned potentiometer with said output terminal. Obviously, whenever the breaker assembly 51 is closed the output terminal 41 will be grounded.

Figure 6 shows the indication which appears on the face 24 of the oscilloscope when the apparatus is arranged to provide a static compression load. In Figure 6 the oscilloscope sweep oscillator has been synchronized with the breaker frequency of the switching means. Intermittent brief closure of the grounding breaker assembly 51 will provide a reference indication 56 having a polarity intermediate the positive and negative polarities of the voltage supply means— i. e., a ground polarity in the apparatus as illustrated. This ground polarity is indicative of a zero load condition.

Intermittent sequential closure of the breaker contact 47 will apply a load signal 53 indicative of the voltage across the bridge resistance element due to the compression load which affects the resistance of said element. Closure of the breaker assembly 48 to connect the tension calibrate potentiometer to the oscilloscope will provide an indication shown at 54, the voltage level of this indication depending upon the position of the movable tap of the potentiometer 32; and similarly closure of the breaker assembly 49 will connect the potentiometer 34 to the oscilloscope to provide compression indication designated at 55. The voltage level of this indication is indicative of the compression calibration as determined by the position of the movable tap of the potentiometer 34. In order to determine the amount of the compression load it is merely necessary to adjust the dial 34a to bring the indication 55 to the same level as the load indication 53. The dial preferably is previously calibrated as above described.

Figure 7 shows the face 24 of the oscilloscope when the apparatus is being used to measure a dynamic load, as for example a load applied by a fatigue machine operating at 4400 cycles per minute with the breaker shaft rotating at 1820 R. P. M. In Fig. 7 the dynamic load signal is designated at 53a and the tension calibrate line, compression calibrate line and zero load axis are designated respectively at 54a, 55a, and 56a. A principal advantage of providing means for varying the speed of operation of the breaker means is that it permits adjustment of the breaker frequency to provide a continuous indication as shown in Fig. 7. In Fig. 7 the oscilloscope sweep has been synchronized with the operation of the fatigue machine. In measuring the load shown in Fig. 7 the potentiometers 32 and 34 may be adjusted by means of the dials 32a and 34a so that the calibration lines coincide with the peak load points. The dials may then be read and the load found by reference to the calibration curve for the testing head being used. Of course if it is desired to apply a known maximum load, the potentiometer may be set to provide indications of the maximum load point and the load of the fatigue machine may then be adjusted so that the load signal matches the calibration lines.

With no additional amplification other than that inherent in the oscilloscope, the deflection sensitivity of the apparatus is about 9600 pounds per square inch stress in steel per inch deflection on the screen of the oscilloscope where the strain gauges are made of "Advance" wire. In the event the gauges are made of other material, as for example, "Isoelastic" wire, the deflection sensitivity may be about 5640 pounds per square inch. If it is desired to increase the deflection sensitivity, a preamplifier stage may be used ahead of the oscilloscope.

Inasmuch as the calibration devices are connected to the same voltage source as is the bridge, variations in the voltage source will effect the calibration lines and load lines proportionally and will not cause error. Furthermore, oscilloscope distortion will affect the calibration lines and the load lines in a similar manner and therefore such distortion may be ignored and does not effect the accuracy of the apparatus.

While I have shown and described one embodiment of my invention, it is capable of many modifications. Changes, therefore, in the construction and arrangement may be made without departing from the spirit and scope of the invention as set forth in the appended claims.

I claim:

1. A load measuring apparatus comprising, in combination, a deformable member; a strain sensitive impedance means mounted on the member; a temperature compensating impedance means mounted on the member; potential-supplying means; the said impedances being connected in series across the potential-supplying means; a load-indicating lead connected to the junction of the said impedances; an impedance means and a potential divider connected in series across the potential-supplying means, the junction of the last-named impedance means and the potential divider being connected to ground, the potential divider having an adjustable tap; a potential indicating oscillograph device having a terminal coupled to ground; and means for connecting sequentially to another terminal of the indicating device the said lead, ground potential, and said tap, to provide a load indication, a no-load reference indication, and a load reference indication.

2. A load measuring apparatus as defined in claim 1 in which the means for connecting is a variable-speed power driven sequential switching device.

3. A load measuring apparatus comprising, in combination, a deformable member; a strain sensitive impedance means mounted on the member; a second impedance means; potential-supplying means; the said impedances being connected in series across the potential-supplying means; a load-indicating lead connected to the junction of the said impedances; two potential dividers connected in series across the potential-supplying means, the junction of the potential dividers being connected to ground, the potential dividers having adjustable taps; a potential indicating oscillograph device having a terminal coupled to ground; and means for connecting sequentially to another terminal of the indicating device the said lead, ground potential, the first of said taps and the second of said taps, to provide a load indication, a no-lead reference indication, and positive and negative load reference indications.

4. A load measuring apparatus comprising, in combination, a deformable member; a strain sensitive impedance means mounted on the member; a temperature compensating impedance means mounted on the member; potential-supplying means; the said impedances being connected in series across the potential-supplying means; a load-indicating lead connected to the junction of the said impedances; two potential dividers connected in series across the potential-supplying means, the junction of the potential dividers being connected to ground, the potential dividers having adjustable taps; a potential indicating oscillograph device having a terminal coupled to ground; and means for connecting sequentially to another terminal of the indicating device the said lead, ground potential, the first of said taps, and the second of said taps, to provide a load indication, a no-load reference indication, and positive and negative load reference indications.

5. A load measuring apparatus comprising, in combination, a deformable member; two strain sensitive impedance means mounted on the member; two temperature compensating impedance means mounted on the member; the impedance means being connected in a bridge circuit with the strain sensitive means in opposite legs of the bridge circuit; means for applying a potential to opposite junctions of the bridge; a line connected to one of the remaining junctions of the bridge, the other of said remaining junctions being grounded; a calibrating circuit comprising a voltage divider connected between one terminal of said potential applying means and ground with an adjustable tap on said voltage divider; a potential indicating oscilloscope device having a terminal coupled to ground; and means for connecting sequentially to another terminal of the indicating device the said line, ground potential, and said tap.

6. A load measuring apparatus comprising, in combination, a deformable member; two strain sensitive impedance means mounted on the member; two temperature compensating impedance means mounted on the member; the said impedance means being connected in a bridge circuit with the strain sensitive means in opposite legs of the bridge circuit; means for applying a potential to opposite junctions of the bridge; a line connected to one of the remaining junctions of the bridge, the other of said remaining junctions being grounded; a calibrating circuit comprising a center-grounded voltage divided connected across said potential applying means and two adjustable taps on said voltage divider, the taps being on opposite sides of the point of ground potential of the voltage divider; a potential indicating oscillograph device having a terminal coupled to ground; and means for connecting sequentially to another terminal of the indicating device the said line, ground potential, the first of said taps, and the second of said taps.

7. A load measuring apparatus comprising, in combination, a deformable member; two strain sensitive impedance means mounted on the member; two temperature compensating impedance means mounted on the member; the impedance means being connected in a bridge circuit with the strain sensitive means in opposite legs of the bridge circuit; means for applying a potential to opposite junctions of the bridge; a line connected to one of the remaining junctions of the bridge, the other of said remaining junctions being grounded; a calibrating circuit comprising a voltage divider with a ground connection intermediate the ends thereof connected across said potential applying means and two adjustable taps on said voltage divider, the taps being on opposite sides of the point of ground potential of the voltage divider; a potential indicating cathode ray oscilloscope device having a terminal coupled to ground; and means for connecting sequentially at a desired cycling rate to another terminal of the indicating device the said line, ground potential, the first of said taps, and the second of said taps.

References Cited in the file of this patent

UNITED STATES PATENTS

| Number | Name | Date |
|---|---|---|
| 1,460,530 | Brown | July 3, 1923 |
| 2,090,188 | Dahlstrom | Aug. 17, 1937 |
| 2,285,118 | Jones | June 2, 1942 |
| 2,423,867 | Zener et al. | July 15, 1947 |
| 2,475,614 | Hoppmann et al. | July 12, 1949 |
| 2,498,306 | Stedmann et al. | Feb. 21, 1950 |

FOREIGN PATENTS

| Number | Country | Date |
|---|---|---|
| 571,003 | Great Britain | Aug. 1, 1945 |